United States Patent Office.

SAMUEL J. EVERETT, OF MAHONEY CITY, PENNSYLVANIA.

Letters Patent No. 111,185, dated January 24, 1871.

IMPROVEMENT IN TREATING FRUIT-TREES TO PREVENT THE RAVAGES OF INSECTS, &c.

The Schedule referred to in these Letters Patent and making part of the same.

*To all whom it may concern:*

Be it known that I, SAMUEL J. EVERETT, of Mahoney City, in the county of Schuylkill and State of Pennsylvania, have invented a new and useful Improvement in the Treatment of Fruit-Trees; and I do hereby declare that the following is a full, clear, and exact description thereof, which will enable others skilled in the art to make and use the same.

This invention relates to a new and useful improvement in the treatment of fruit and other trees for preserving them from the ravages of worms, grubs, and insects; and It consists in combining the ingredients hereinafter named, for applying to the tree, in the manner described.

In carrying out my invention and discovery, I make use of the following ingredients, in about the proportions and manner described, for forming a wash or first application to the tree—or Compound No. 1—viz: one pound of salts of potash, one-half pound of salts of soda, one-half pound of sal-soda, dissolved in three gallons of boiling water. When so disposed, stir in three pounds of tallow or grease of any kind. Keep this compound boiling and well stirred until all sediment is deposited and the mixture becomes clear, after which add twenty gallons of water, and raise the whole to a temperature of 212°, (or the boiling point,) and let it cool; after which add one pint of black oil and one pint of fish-oil, when the compound is ready for use.

The above is designed as a wash for the body of the tree, and is applied from the roots upward as high as can be conveniently reached.

I next apply a compound for destroying or expelling grubs, worms, and insects, composed of the following ingredients, and numbered 2, viz: To twenty gallons of rain-water add two pounds of hartshorn, one quart of soot, one quart of tanners' oil, one and one-half pint coal-tar, one pint pine-tar, one pint salt, one-fourth pound alum, one-fourth pound red pepper. This compound should be allowed to stand about two weeks, and should be well stirred every day, and should be stirred as it is used. A quantity of straw or hay is saturated with this compound and placed in contact with the roots of the tree after the earth has been removed.

This latter compound may be successfully employed for preparing seed for planting, and for protecting growing vegetables; but I design the two compounds to be applied to fruit-trees in the manner described above.

Having thus described my invention,

I claim as new and desire to secure by Letters Patent—

1. The above-described mode of treating fruit-trees, substantially as and for the purposes described.

2. The compounds No. 1 and No. 2, substantially as and for the purposes herein described.

SAMUEL J. EVERETT.

Witnesses:
M. M. KETNER,
F. BENNER.